Patented Jan. 11, 1938

2,105,361

UNITED STATES PATENT OFFICE 2,105,361

COMPOUNDS OF POLYMERIZED ACRYLIC ACID OR ITS ESTERS WITH SULPHUR OR SELENIUM AND METHOD OF MAKING THE SAME

Paul Nowak, Berlin-Charlottenburg, Germany, assignor to General Electric Company, Schenectady, N. Y.

No Drawing. Application October 22, 1934, Serial No. 749,476. In Germany October 24, 1933

6 Claims. (Cl. 260—2)

This invention relates to artificial rubber and more especially to a process of producing elastic substances from acrylic acid and its derivatives. It is an object of my invention to provide means whereby substances of the kind described can be obtained, which substances possess particularly favorable properties as regards elasticity and resistivity to the action of mineral oils, etc.

As is well known to those skilled in the art, if the products of polymerization of isoprene or similar hydrocarbons are subjected to vulcanization, the products thus obtained are less sensitive to changes of temperature and more elastic than the known vulcanized products.

It is known that acrylic acid and derivatives thereof, for example, the esters of acrylic acid, on being polymerized, form elastic masses and that these masses can equally be rendered less sensitive to changes of temperature and will be more elastic, if subjected to a heat treatment without however adding sulphur. While quantities of sulphur between about 1 and 32% can easily be introduced into the natural or synthetic caoutchouc, a similar treatment of the products of polymerization of acrylic acid and its derivatives does not lead to products in which the sulphur is linked to the acrylic acid radical. For, the sulphur added before vulcanization can be substantially extracted from the vulcanized products by means of suitable solvents, such as for instance carbon disulphide. Probably this difference in the behaviour of the acrylic acid and the isoprene or other hydrocarbons is due to the difference in their chemical constitution.

I have now found that I can easily and simply link sulphur to the esters of acrylic acid and its derivatives by causing the sulphur or selenium, or a compound splitting off either sulphur or selenium, to act on the polymerized ester in the presence of a surface catalyst such as for instance active gas soot. The products thus obtained possess better elastic properties than the starting products and are resistive to the action of mineral oils.

In practicing my invention I may proceed for instance, as follows:—

Example 1

30 parts by weight of a polymerized acrylic acid ethyl ester are mixed by milling at 90 to 110° C. with one part finely ground sulphur and one part beta-naphthol. This procedure is carried on about 20 minutes and there is then gradually added a mixture of 20 parts active gas soot and 50 parts talc, the temperature being kept constant at about 110° C. In order to provide for a good mixing of the components the milling is continued for a further 20 minutes, while the temperature is allowed to drop slowly.

The product thus obtained is more elastic than polymerized acrylic acid ethyl ester and is resistive to the action of mineral oils.

Example 2

Polymerized acrylic acid ethyl ester is mixed with sulphur and beta-naphthol as described with reference to Example 1 and to the mixture is added a mixture of 40 parts talc and 30 parts of a highly active magnesium silicate. By treating this mixture as described with reference to Example 1, there is obtained a grey mass having mechanical properties similar to those of the product obtained according to Example 1.

Example 3

30 parts acrylic acid ethyl ester are mixed with one part beta-naphthol, .75 parts sulphur and .75 parts amorphous selenium as described with reference to Example 1. To the mixture is then added a filler and a surface catalyst substantially as described with reference to Example 1.

Example 4

50 parts of a polymerized methacrylic acid methyl ester are intimately mixed by milling at 100 to 130° C. with one part sulphur and one part beta-naphthol. To the mixture is then added a mixture of 20 parts active gas soot and 28 parts talc and the mixture is treated further as described with reference to Example 1. There is thus obtained a solid mass resembling ebonite.

Various changes may be made in the details disclosed in the foregoing specification without departing from the invention or sacrificing the advantages thereof.

In the claims affixed to this specification no selection of any particular modification of the invention is intended to the exclusion of other modifications thereof.

I claim:—

1. The method of producing an artificial rubber resistant to the action of mineral oils and the like which comprises reacting a member of the class consisting of polymerized acrylic acid and polymerized esters of acrylic acid with an element of the group consisting of sulphur and selenium in the presence of a member of the class consisting of active gas soot and active magnesium silicate.

2. The method of producing an artificial rubber resistant to the action of mineral oils and the like which comprises reacting a polymerized ester of acrylic acid with an element of the group consisting of sulphur and selenium in the presence of active gas soot.

3. An artificial rubber comprising a polymerized ester of acrylic acid vulcanized with an element of the group consisting of sulphur and selenium in the presence of active gas soot.

4. An artificial rubber comprising the reaction product of about 30 parts by weight of polymerized ethyl ester of acrylic acid, about 1 part by weight of sulphur and about 20 parts by weight of active gas soot, said product having the characteristic properties of being resistive to the action of mineral oils and more elastic than polymerized acrylic acid ethyl ester.

5. An artificial rubber comprising the reaction product of about 30 parts by weight of polymerized ethyl ester of acrylic acid, about 1 part by weight of sulphur and about 30 parts by weight of active magnesium silicate, said product having the characteristic properties of being resistive to the action of mineral oils and more elastic than polymerized acrylic acid ethyl ester.

6. A composition of matter comprising a member of the class consisting of polymerized acrylic acid and polymerized esters of acrylic acid vulcanized with an element of the group consisting of sulphur and selenium in the presence of a member of the class consisting of active gas soot and active magnesium silicate.

PAUL NOWAK.